United States Patent
Pogorelik et al.

(10) Patent No.: US 9,571,464 B2
(45) Date of Patent: Feb. 14, 2017

(54) NETWORK-ENABLED DEVICE PROVISIONING

(71) Applicant: Intel Corporation, Santa Clara, CA (US)

(72) Inventors: Oleg Pogorelik, Lapid (IL); Efrat Levy, Jerusalem (IL); Alex Nayshtut, Gan Yavne (IL)

(73) Assignee: INTEL CORPORATION, Santa Clara, CA (US)

( * ) Notice: Subject to any disclaimer, the term of this patent is extended or adjusted under 35 U.S.C. 154(b) by 83 days.

(21) Appl. No.: 14/456,509

(22) Filed: Aug. 11, 2014

(65) Prior Publication Data
US 2016/0044001 A1 Feb. 11, 2016

(51) Int. Cl.
H04L 29/06 (2006.01)
H04L 9/00 (2006.01)
H04L 29/08 (2006.01)
H04W 24/00 (2009.01)
H04L 9/08 (2006.01)
(Continued)

(52) U.S. Cl.
CPC ........... *H04L 63/0428* (2013.01); *H04L 9/085* (2013.01); *H04L 63/061* (2013.01); *H04L 67/104* (2013.01); *H04W 12/04* (2013.01); *H04W 24/00* (2013.01); *H04W 4/005* (2013.01)

(58) Field of Classification Search
CPC .... H04L 63/0428; H04L 67/104; H04L 9/085; H04L 63/061; H04W 12/04; H04W 24/00; H04W 4/005
See application file for complete search history.

(56) References Cited

U.S. PATENT DOCUMENTS 6,052,605 A * 4/2000 Meredith ............ H04W 72/082
455/560
6,182,214 B1 * 1/2001 Hardjono ................ H04L 9/085
380/255
(Continued)

OTHER PUBLICATIONS

Cachin, Security and Fault-tolerance in Distributed Systems, Chapter 7 Distributed Cryptography, IBM Research—Zurich, 2012, p. 1-8.*
(Continued)

*Primary Examiner* — Hosuk Song
*Assistant Examiner* — Stephen Gundry
(74) *Attorney, Agent, or Firm* — Schwabe, Williamson & Wyatt, P.C.

(57) ABSTRACT

Systems, devices, and techniques for network-enabled device provisioning are disclosed herein. In some embodiments, a network-enabled device may include: a storage device; listening logic to wirelessly receive a plurality of key fragments from a corresponding plurality of peer devices, to cause storage of the plurality of key fragments in the storage device, and to receive an encrypted provisioning message from a management device; key generation logic to generate a decryption key based on the plurality of key fragments stored in the storage device to decrypt the encrypted provisioning message, and to decrypt the encrypted provisioning message using the decryption key; and control logic to provision the network-enabled device in accordance with instructions included in the decrypted provisioning message. Other embodiments may be disclosed and/or claimed.

27 Claims, 6 Drawing Sheets

(51) Int. Cl.
*H04W 12/04* (2009.01)
*H04W 4/00* (2009.01)

(56) References Cited

U.S. PATENT DOCUMENTS

| | | | | |
|---|---|---|---|---|
| 6,477,254 | B1* | 11/2002 | Miyazaki | H04L 9/085 380/283 |
| 6,857,071 | B1* | 2/2005 | Nakae | G06F 21/10 380/277 |
| 7,165,173 | B1* | 1/2007 | Herle | H04L 63/0428 380/270 |
| 8,356,181 | B2* | 1/2013 | Brickell | H04L 9/3073 713/180 |
| 8,370,624 | B2* | 2/2013 | Yi | H04L 9/0891 380/277 |
| 8,917,872 | B2* | 12/2014 | Li | H04L 9/085 380/277 |
| 9,374,221 | B1* | 6/2016 | Juels | H04L 9/321 |
| 2003/0147536 | A1 | 8/2003 | Andivahis et al. | |
| 2003/0204748 | A1* | 10/2003 | Chiu | H04L 63/0428 726/3 |
| 2003/0211842 | A1* | 11/2003 | Kempf | H04L 9/0825 455/411 |
| 2004/0064699 | A1* | 4/2004 | Hooker | H04L 9/3271 713/170 |
| 2004/0179691 | A1* | 9/2004 | Hori | G06F 21/10 380/277 |
| 2005/0080746 | A1* | 4/2005 | Zhu | G06F 21/10 705/59 |
| 2005/0276416 | A1* | 12/2005 | Zhu | H04N 7/1675 380/210 |
| 2006/0136713 | A1* | 6/2006 | Zimmer | H04L 63/0428 713/150 |
| 2007/0239615 | A1* | 10/2007 | Matsuzaki | G06K 19/07749 705/55 |
| 2007/0239984 | A1* | 10/2007 | Lang | H04L 63/0428 713/167 |
| 2008/0080713 | A1* | 4/2008 | Cho | H04L 9/0822 380/273 |
| 2012/0243687 | A1* | 9/2012 | Li | H04L 9/085 380/277 |
| 2013/0010966 | A1* | 1/2013 | Li | H04L 9/0888 380/278 |
| 2013/0177157 | A1* | 7/2013 | Li | H04L 9/083 380/277 |
| 2014/0173288 | A1 | 6/2014 | Lieber et al. | |
| 2014/0325220 | A1* | 10/2014 | Tunnell | G06F 21/00 713/168 |
| 2014/0331061 | A1* | 11/2014 | Wright | H04L 9/085 713/189 |
| 2015/0081904 | A1* | 3/2015 | Guedalia | H04L 41/28 709/225 |
| 2015/0127733 | A1* | 5/2015 | Ding | H04W 4/08 709/204 |
| 2015/0229726 | A1* | 8/2015 | Jimenez | H04W 4/005 709/227 |
| 2015/0334181 | A1* | 11/2015 | Jimenez | H04L 67/2861 709/204 |
| 2015/0350167 | A1* | 12/2015 | Djakovic | H04L 63/0428 713/163 |
| 2016/0066184 | A1* | 3/2016 | Bhargav-Spantzel | G06F 21/40 726/7 |
| 2016/0149878 | A1* | 5/2016 | Pogorelik | H04L 63/062 380/283 |

OTHER PUBLICATIONS

Narasimha et al., On the Utility of Distributed Cryptography in P2P MANETs: the case of Membership Control, IEEE, Proc. of the 11th IEEE International Conference on Network Protocols, p. 1-10.*
International Search Report and Written Opinion mailed Sep. 9, 2015 for International Application No. PCT/US2015/034280, 12 pages.

* cited by examiner

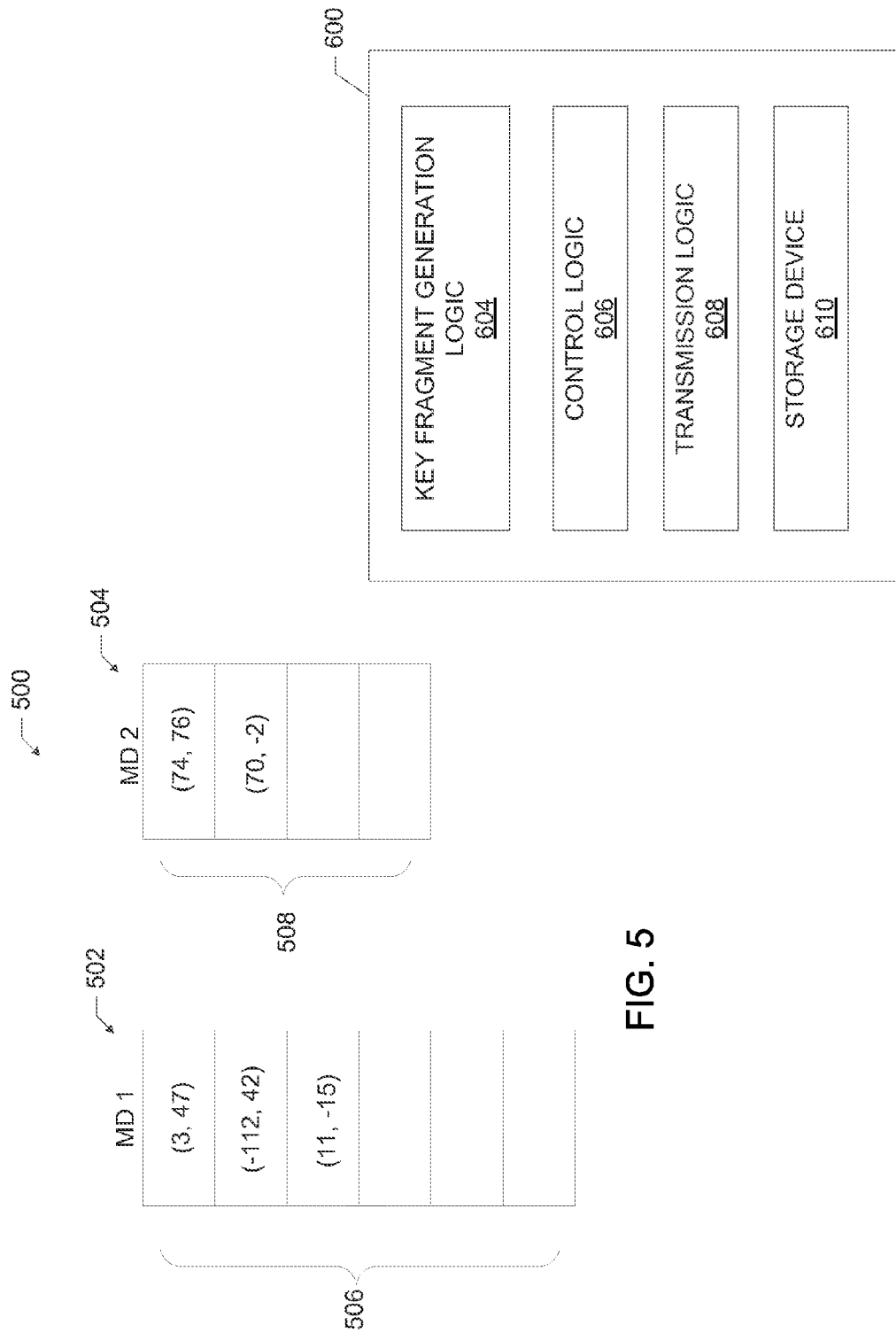

NETWORK-ENABLED DEVICE PROVISIONING

TECHNICAL FIELD

The present disclosure relates to network-enabled devices, and more particularly, to network-enabled device provisioning.

BACKGROUND

When a network-enabled device is first introduced into a new environment, the device must be configured to recognize and respond to other devices in the network securely. Typically, this configuration requires that an administrator manually provide keys, passwords, Internet Protocol (IP) addresses, and other information to the device to achieve a secure pairing. This manual configuration is time-consuming, error-prone, and not readily scalable to an Internet of Things in which tens or hundreds of devices within the home are network-enabled.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 5 illustrates a second data structure for storing key fragments in the storage device, in accordance with various embodiments.

FIG. 6 is a block diagram of a network-enabled device that may serve as a management device, in accordance with various embodiments.

DETAILED DESCRIPTION

Figure 1:
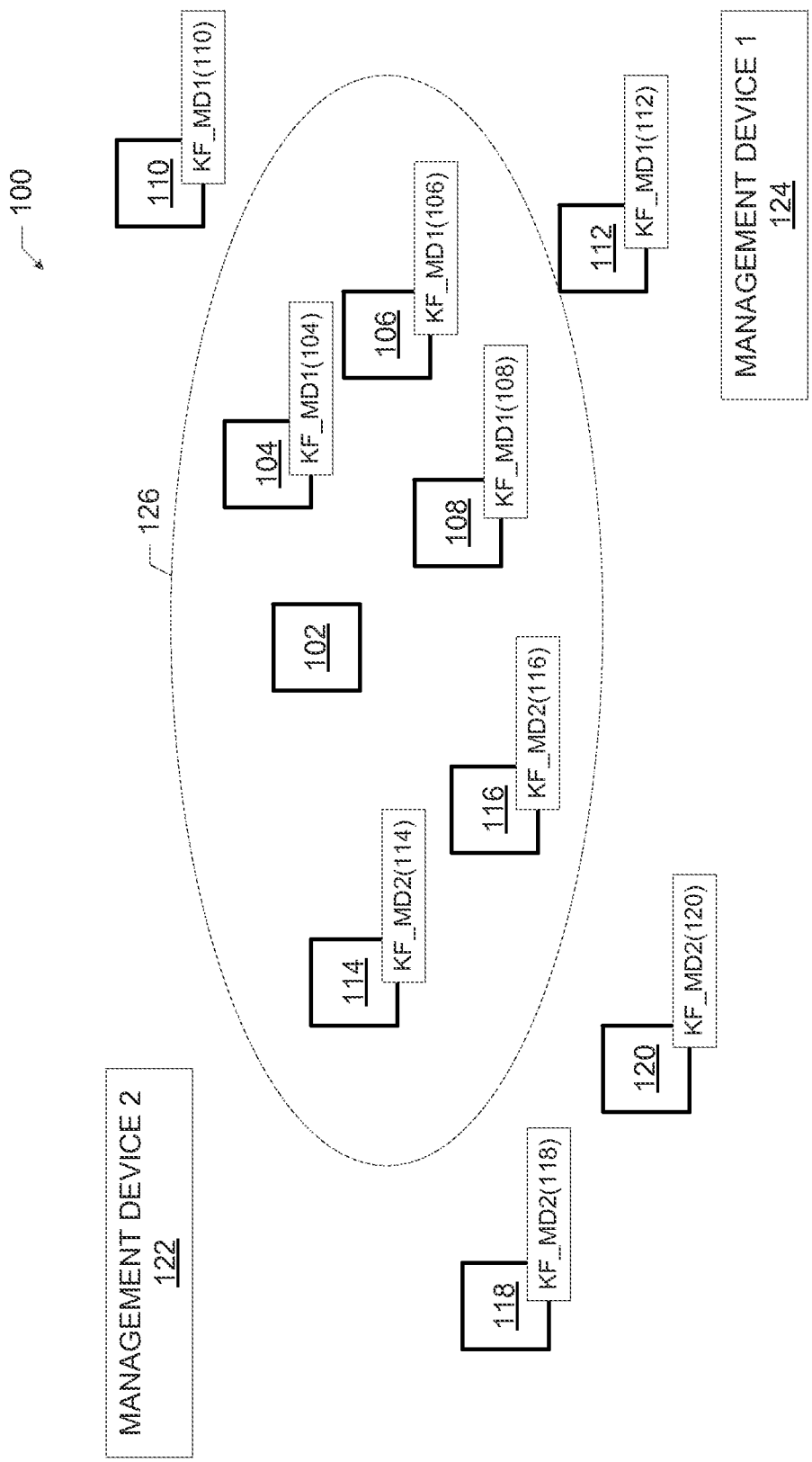
FIG. 1 depicts a device environment in which a number of network-enabled devices may be managed by a network-enabled first management device and other network-enabled devices are managed by a network-enabled second management device, in accordance with various embodiments.

Systems, devices, and techniques are disclosed herein for the provisioning of network-enabled devices. In some embodiments, network-enabled device may include: a storage device; listening logic to wirelessly receive a plurality of key fragments from a corresponding plurality of peer devices, to cause storage of the plurality of key fragments in the storage device, and to receive an encrypted provisioning message from a management device; key generation logic to generate a decryption key based on the plurality of key fragments stored in the storage device to decrypt the encrypted provisioning message, wherein the decryption key cannot be generated if fewer key fragments than a predetermined number of key fragments are stored in the storage device, and wherein the predetermined number is greater than or equal to two; and control logic to decrypt the encrypted provisioning message using the decryption key and provision the network-enabled device in accordance with instructions included in the decrypted provisioning message. In this manner, the network-enabled device may be provisioned for management by the management device without requiring manual configuration of the network-enabled device.

In some embodiments, a network-enabled device may include: a storage device; control logic to receive a key fragment in a control message from a management device that manages the network-enabled device and to cause storage of the key fragment in the storage device, wherein the key fragment is generated in accordance with a secret sharing technique such that a decryption key may be generated by a device having access to a predetermined number of different key fragments, the predetermined number is greater than or equal to two, and the decryption key is complementary to an encryption key used to encrypt a provisioning message broadcast by the management device; and transmission logic to wirelessly transmit the key fragment for receipt by a device located within a predetermined proximity of the network-enabled device. In this manner, the network-enabled device may assist in provisioning the device that receives the key fragment for management by the management device.

In some embodiments, a network-enabled device may include: a storage device; key fragment generation logic to generate a plurality of key fragments based on a decryption key, wherein the decryption key is generatable from a predetermined number of key fragments and not generatable from a number of key fragments less than the predetermined number, and wherein the predetermined number is greater than or equal to two; control logic to generate an encrypted provisioning message decryptable with the decryption key, wherein the provisioning message includes instructions to provision a receiving device for management by the network-enabled device; and transmission logic to provide the plurality of key fragments to a corresponding plurality of devices managed by the network-enabled device and to broadcast the encrypted provisioning message. In this manner, the network-enabled device may provide key fragments to a plurality of managed devices, which may in turn provide the key fragments to a device that receives the encrypted provisioning message broadcast, enabling this receiving device to generate the decryption key, decrypt the provisioning message, and be provisioned for management by the network-enabled device.

The systems, devices, and techniques disclosed herein may be particularly advantageous when used to provision Internet of Things (IoT) devices. In particular, the techniques disclosed herein may be particularly useful for provisioning devices that are proximate to a number of peer devices managed by a particular intended management device such that it is likely that the device to be provisioned will receive the predetermined number of key fragments and an encoded provisioning message associated with the intended management device before the device to be provisioned receives such components associated with another unintended management device. For example, if a network-enabled household appliance is introduced into a household, the appliance may be in closer proximity to a number of devices managed by a common household management device than to devices managed by a neighbor's management device. Consequently, it is likely that the appliance will receive a sufficient number of key fragments from other devices in the same household to generate a decryption key for the household management device before the appliance receives a sufficient number of key fragments from devices in a neighbor's household. The appliance may be more likely to be correctly provisioned for management by the household management device rather than the neighbor's management device. Thus, the embodiments disclosed herein may be particularly advantageous when the majority of peer devices within proximity of an un-provisioned device are all managed by the same management device, and that management device is the intended manager of the un-provisioned device.

As the number of network-enabled devices increases, network-enabled devices are expected to be built into homes, appliances, roads, walls, surfaces, and vehicles, or worn or carried by individual people. Given this volume of devices, manual provisioning, setup, and configuration of these devices (e.g., by manual entry of provisioning information by an end-user or administrator on a site visit or in a laboratory) may be prohibitive. Additionally, many IoT devices may lack standard control interfaces (such as pin pads, wired connections, buttons, etc.) so the act of first-time association between the device and its intended manager may not be amenable to conventional solutions.

Various embodiments disclosed herein may enable fully automated provisioning of an un-provisioned network-enabled device. Various embodiments may not require user involvement, nor any physical inputs or validations. Various embodiments may be scalable as the number of network-enabled devices increases; in particular, provisioning of a new device may become faster as more peer devices are included in an environment since the probability that a key fragment received is from an intended management device may increase. Various embodiments disclosed herein may provide a user-friendly, automated, secure, reliable, and inexpensive approach to provisioning newly introduced network-enabled devices. In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description uses the phrases "in an embodiment," or "in embodiments," which may each refer to one or more of the same or different embodiments. Furthermore, the terms "comprising," "including," "having," and the like, as used with respect to embodiments of the present disclosure, are synonymous. As used herein, the term "logic" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality. As used herein, the phrase "coupled" may mean that two or more elements are in direct physical or electrical contact, or that two or more elements are not in direct contact with each other, but yet still cooperate or interact with each other (e.g., via one or more intermediate elements, which may perform their own transformations or have their own effects). For example, two elements may be coupled to each other when both elements communicate with a common element (e.g., a memory device).

As used herein, a signal may be "received" by a component if it is generated externally or internally to that component, and acknowledged and/or processed by that component. As used herein, "wireless transmission" of data may include communicating data over a wireless or air interface via any desired wireless communication protocol. The wireless communications protocols may include connections via a wireless local area network (WLAN), personal area network (PAN), or other like network using protocols such as Wireless Fidelity (Wi-Fi) including the Institute of Electrical and Electronics Engineers (IEEE) 802.11a, IEEE 802.11b, IEEE 802.11g, IEEE 802.11ac. IEEE 802.11m, and/or IEEE 802.11n. The wireless communications protocols may also include cellular communication protocols, such as Global System for Mobile Communications (GSM), Enhanced Data GSM Environment (EDGE), wideband code division multiple access (WCDMA), code division multiple access (CDMA), time division multiple access (TDMA), voice over Internet Protocol (VoIP), WiMAX (IEEE 802.16m), 3rd Generation Partnership Project (3GPP) Long Term Evolution (LTE), and/or any other wireless communication protocols. The wireless communications protocols may include direct wireless connection protocols such as Bluetooth low energy (BLE), Bluetooth, Wi-Fi including Wi-Fi direct and/or Tunneled Direct Link Setup (TDLS), LTE Proximity Services (ProSe) protocols, or Zigbee, Infrared Data Association (IrDA) protocols, ANT and/or ANT+ protocols, and/or any other like "near-field" wireless communication protocol. As used herein, the term "network-enabled" may be used to refer to a device that is configurable to communicate with other devices (e.g., "directly" using a device-to-device communication technique or "indirectly" via the Internet or another communication intermediary). As used herein, a first device may be said to "manage" a second device if, for example, the first device is expected to be a decision maker and to originate commands for the second device to follow. The second device is expected to execute the commands originated from the first device, and send notifications to the first device when appropriate.

FIG. 1 depicts a device environment 100 in which a number of network-enabled devices may be managed by a network-enabled first management device 124 and other network-enabled devices are managed by a network-enabled second management device 122, in accordance with various embodiments. In particular, the network-enabled devices 104-112 are managed by the first management device 124 and the network-enabled devices 114-120 are managed by the second management device 122. The device environment 100 may also include a network-enabled device 102, which is not yet managed by any management device. For ease of discussion, a network-enabled device that is not yet managed by any management device may be referred to herein as an "new device," and network-enabled devices that are managed by a management device may be referred to as "peer devices." In FIG. 1, the network-enabled device 102 may be referred to as the new device 102, and the network-enabled devices 104-120 may be referred to as the peer devices 104-120, respectively. In some embodiments, the new device 102 may be configured with similar logic as any of the peer devices 104-120; the new device 102 simply has not yet been provisioned for management by a particular management device. The numbers of peer devices and management devices shown in FIG. 1 are simply illustrative, and the techniques disclosed herein may operate within a device environment that includes any suitable number of management devices and peer devices.

Each of the peer devices 104-120 may store a key fragment. The key fragments stored by a particular peer device may be provided to that peer device by the management device that manages the peer device. For example, the peer devices 104-112 may each store a key fragment provided by the first management device 124, while the peer devices 114-120 may each store a key fragment provided by the second management device 122. The notation KF_YY (ZZ) may be used herein to denote the key fragment provided to the peer device ZZ by the management device YY. For example, the notation KF_MD1(104) may denote the key fragment provided to the peer device 104 by the first management device 124, while the notation KF_MD2(118) may denote the key fragment provided to the peer device 118 by the second management device 122.

In some embodiments, each of the peer devices 114-120 may receive its key fragment in a control message from the management device that manages the peer device. In some embodiments, a management device may provide a different key fragment to each of its peer devices, while in other embodiments, some peer devices owned by a common management device may store a same key fragment. As discussed below in further detail, the key fragments may be generated by a management device such that access to a predetermined number of the key fragments may enable the generation of a decryption key associated with the management device. The predetermined number may be 2, 3, 4, 10, 30 or any desired number. This decryption key may be used to decrypt an encrypted provisioning message transmitted by the management device.

Each of the peer devices 104-120 may be configured to wirelessly transmit its key fragment for receipt by a device located within a predetermined proximity of the peer device. In some embodiments, each of the peer devices 104-120 may broadcast its key fragment such that it may be received by any wireless device within a listening range of the peer device. In some embodiments, the key fragment transmitted by a peer device may be transmitted as a part of key fragment data. The key fragment data may include additional data relevant to the use of the key fragment, such as an identifier of the management device that manages the peer device. In some embodiments, the key fragment data may include an ordinal specifying where in a sequence of key fragments the particular key fragment is to fall.

The peer devices 104-120 may be geographically distributed around the new device 102. Some of the peer devices 104-120 may be within a predetermined proximity of the new device 102 indicated by the boundary 126. In FIG. 1, the peer devices 104-108 and 114-116 are shown as within the boundary 126, while the peer devices 110-112 and 118-120 are shown as outside the boundary 126. Although the boundary 126 is depicted as elliptical in shape, the predetermined proximity may have any appropriate boundary. In some embodiments, the predetermined proximity defined by the boundary 126 may represent the area in which a peer device may broadcast its key fragment with sufficient signal strength so as to be received by the new device 102. For example, some low energy Bluetooth transmitters may communicate to devices located within approximately 10 meters of the transmitter, some standard Bluetooth transmitters may communicate to devices located within approximately 20 meters of the transmitter, and some Wi-Fi transmitters may communicate to devices located within approximately 300 meters of the transmitter.

In some embodiments, a peer device may be within the boundary 126 if the received signal strength of a wireless signal transmitting a key fragment from the peer device exceeds a predetermined threshold stored by the new device 102. The predetermined threshold may be a function of the wireless communication protocol used by the peer device to transmit the key fragment. For example, since Wi-Fi transmitters are typically more powerful than low energy Bluetooth transmitters (as discussed above), the threshold on received signal strength that may be used to establish that a transmitting device is within, for example, 20 meters of the new device 102 may be lower if the peer device is using a low energy Bluetooth transmitter than if the peer device is using a Wi-Fi transmitter.

In some embodiments, key fragment data transmitted by a peer device may include information about the geographic location of the peer device (e.g., GPS coordinates or information that allows the new device 102 to triangulate the location of the peer device based on the location of other wireless beacons). In such embodiments, the new device 102 may be configured to detect and store its own geographic location, and to receive and store key fragments transmitted in key fragment data that indicates that the transmitting peer device is within a predetermined proximity of the new device 102 (based on the geographic locations). Although the management devices 122 and 124 are illustrated as outside the boundary 126, one or both of the management devices 122 and 124 may be located within the boundary 126.

The new device 102 may be configured to receive and store key fragments wirelessly transmitted by some or all of the peer devices 104-120. In some embodiments, the new device 102 may only receive and store key fragments wirelessly transmitted by peer devices within the predetermined proximity of the new device defined by the boundary 126. In such embodiments, in the device environment 100, the new device 102 may be configured to receive and store key fragments from the peer devices 104-108 and 114-116. Key fragments transmitted by the peer devices 110-112 and 118-120 may not be received by the new device 102 (for example, because the received signal strengths of wireless signals transmitted from these peer devices do not exceed the predetermined threshold, e.g., these peer devices are too far away to successfully communicate with the new device 102) or may be received but not stored by the new device 102 (for example, because geographic location information transmitted in key fragment data indicates that these peer devices are outside the boundary 126).

As noted above, the key fragments provided by a management device may be generated such that access to a predetermined number of the key fragments may enable the generation of a decryption key associated with the management device. This decryption key may be used to decrypt an encrypted provisioning message transmitted by the management device. Thus, if the new device 102 has received and stored the predetermined number of key fragments associated with a management device, the new device 102 may be enabled to generate a decryption key for decrypting an encrypted provisioning message transmitted by that management device. In some embodiments, only peer devices managed by a particular management device may transmit key fragments associated with that management device. For example, in some embodiments, only the peer devices 104-112 may attempt to provide key fragments associated with the first management device 124 to the new device 102, while only the peer devices 114-120 may attempt to provide key fragments associated with the second management device 122 to the new device 102. Thus, in some embodiments, the new device 102 may only be able to generate a decryption key to decrypt an encrypted provisioning message from the first management device 124 if the new device 102 has received and stored a sufficient number of key fragments from the peer devices 104-112 managed by the first management device 124. Analogously, the new device 102 may only be able to generate a decryption key to decrypt an encrypted provisioning message from the second management device 122 if the new device 102 has received and stored a sufficient number of key fragments from the peer devices 114-120 managed by the second management device 122.

The management devices 122 and 124, in addition to generating the key fragments and providing them to the peer devices, may each also be configured to generate and cause the transmission of an encrypted provisioning message, as discussed above. In some embodiments, a management device may be configured to wirelessly broadcast the encrypted provisioning messages to any device within a listening range of the management device. The provisioning message may include instructions to provision a device that receives the provisioning message for management by the transmitting management device. For example, a provisioning message transmitted in encrypted form by the first management device 124 may include instructions for provisioning a receiving device for management by the first management device 124, while a provisioning message transmitted in encrypted form by the second management device 122 may include instructions for provisioning a receiving device for management by the second management device 122.

An encrypted provisioning message transmitted by a management device may be decrypted by a receiving device that has an appropriate decryption key. Thus, only receiving devices that have the appropriate decryption key may decrypt the encrypted provisioning message and thereby be provisioned for management by the management device in accordance with the instructions therein. In embodiments in which a predetermined number of key fragments associated with a management device must be received and stored by the new device 102 in order to generate the decryption key, receipt and storage of this predetermined number of key fragments may be a necessary condition for the new device 102 to become managed by the management device.

In some embodiments, the new device 102 may determine whether it has received and stored a sufficient number of key fragments associated with a particular management device upon receipt of an encrypted provisioning message from that management device. Thus, if the new device 102 is receiving and storing key fragments and/or encrypted provisioning messages associated with both the first management device 124 and the second management device 122, the first management device to transmit its encrypted provisioning message after the new device 102 has received and stored a sufficient number of key fragments associated with that management device will become the manager of the new device 102.

In other embodiments, the new device 102 may be configured to store encrypted provisioning messages and to evaluate whether a sufficient number of key fragments have been received and stored to decrypt the stored encrypted provisioning messages as key fragments are received. In such embodiments, if the new device 102 is receiving and storing key fragments and/or encrypted provisioning messages associated with both the first management device 124 and the second management device 122, and if the new device 102 1) receives and stores a sufficient number of key fragments associated with the first management device 124 and 2) and receives an encrypted provisioning message from the first management device 124 before both of these conditions are satisfied with respect to the second management device 122, the new device 102 will be managed by the first management device 124.

Various embodiments of new devices (e.g., the new device 102), peer devices (e.g., the peer devices 104-120), management devices (e.g., the first management device 124 and the second management device 122), and related systems and techniques are discussed below.

Figure 2:
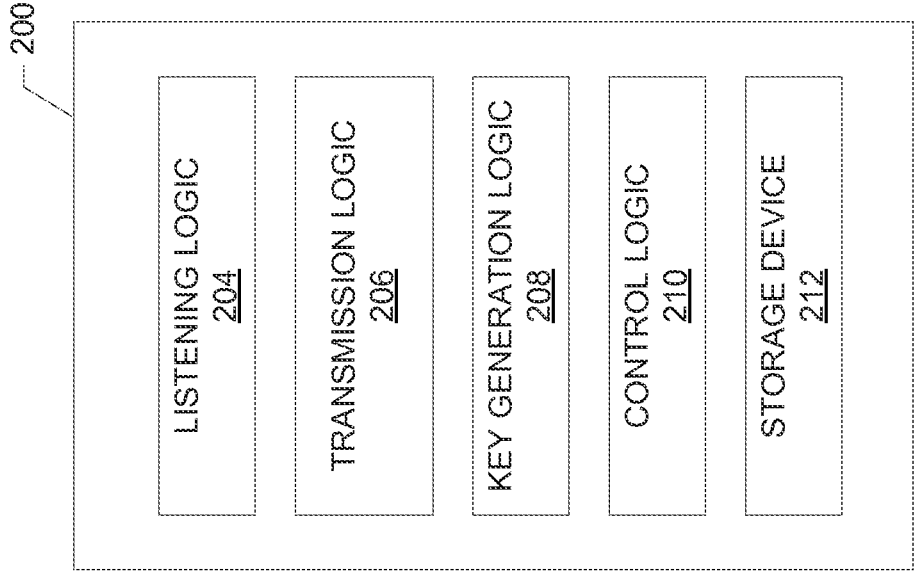
FIG. 2 is a block diagram of a network-enabled device that may serve as a new device or a peer device, in accordance with various embodiments.

FIG. 2 is a block diagram of a network-enabled device 200 that may serve as a new device (e.g., the new device 102) or a peer device (e.g., any of the peer devices 104-120), in accordance with various embodiments. The components illustrated in FIG. 2 are not exhaustive of all of the components that may be included in a new device or a peer device, but represent components that may be relevant to provisioning of network-enabled devices in accordance with the techniques disclosed herein. Examples of devices that may include the components of the network-enabled device 200 are discussed below with reference to FIG. 8.

The network-enabled device 200 may include listening logic 204. The listening logic 204 may be configured to receive data transmitted by other network-enabled devices. For example, the listening logic 204 may be coupled to an antenna (not shown) and may be configured to receive wirelessly transmitted data. The listening logic 204 may generally be configured for communication with the management device that manages the network-enabled device 200 and any other suitable devices.

In some embodiments, the listening logic 204 may be configured to wirelessly receive key fragments from peer devices. The listening logic 204 may be coupled to the storage device 212, and may be configured to cause storage of received key fragments in the storage device 212. As discussed below with reference to FIGS. 4 and 5, the listening logic 204 may be configured to cause the storage of key fragments in any suitable data structure in the storage device 212. For example, the storage device 212 may include a buffer into which key fragments are stored as they are received. In some embodiments, the listening logic 204 may be configured to remove key fragments from the buffer that have been in the buffer for longer than a predetermined time period. A number of examples of data structures that may be included in the storage device 212 for storing key fragments are discussed herein (e.g., below with reference to FIGS. 5 and 6).

In some embodiments, the listening logic 204 may be configured to only wirelessly receive or cause storage of key fragments if the network-enabled device 200 is a new device; if the network-enabled device 200 has already been provisioned for management by a particular management device, the listening logic 204 may be configured to ignore or simply not store key fragments broadcast to the network-enabled device 200. In some embodiments, key fragments may be included in key fragment data messages that may include additional data, as discussed above. For example, key fragment data may include a key fragment and a corresponding identifier of the management device associated with the key fragment.

In some embodiments, the listening logic 204 may be configured to receive key fragments associated with different management devices and to store those key fragments in different memory regions of the storage device 212. For example, in some embodiments, the storage device 212 may include multiple buffers, each associated with a different management device and configured to store key fragments associated with the respective management device.

In some embodiments, the listening logic 204 may be configured to receive an encrypted provisioning message from a management device and cause storage of the encrypted provisioning message in the storage device 212. In some embodiments, the listening logic 204 may be configured to only receive or cause storage of encrypted provisioning messages if the network-enabled device 200 is a new device; if a network-enabled device 200 has already been provisioned for management by a particular management device, the listening logic 204 may be configured to ignore or simply not store encrypted provisioning messages broadcast to the network-enabled device 200.

In some embodiments, the listening logic 204 may be configured to receive a control message from a management device, and to pass the control message to control logic 210 (discussed below) for further processing. After a peer device has been provisioned for management by a management device, but before that peer device has a key fragment associated with that management device to transmit to new devices, the peer device may receive its key fragment from the management device in a control message, and may store its key fragment in the storage device 212. Thus, in some embodiments, the listening logic 204 may be configured to receive a control message that includes a key fragment for later wireless transmission to new devices.

A network-enabled device 200 may include transmission logic 206. The transmission logic 206 may be configured to transmit data for receipt by other network-enabled devices. For example, the transmission logic 206 may be coupled to an antenna (not shown) and may be configured to wirelessly transmit data. The transmission logic 206 may generally be configured for communication with the management device that manages the network-enabled device 200 and any other suitable devices.

In some embodiments in which the network-enabled device 200 is a peer device, the transmission logic 206 may be coupled with the storage device 212, and may be configured to wirelessly transmit its key fragment (stored, e.g., in the storage device 212) for receipt by new devices within a predetermined proximity of the network-enabled device 200. For example, the transmission logic 206 may be configured to wirelessly broadcast the key fragment.

In some embodiments in which the network-enabled device 200 is a peer device, the transmission logic 206 may wirelessly transmit its key fragment at periodic intervals. In some embodiments, the periodic intervals may be spaced apart by a predetermined number of seconds, minutes, hours, or days. The frequency with which the transmission logic 206 wirelessly transmits its key fragment may be specified by the management device that manages the network-enabled device 200, or may be pre-stored in the transmission logic 206 (e.g., by the manufacturer of the network-enabled device 200). Higher transmission frequencies require increased energy expenditure, but may improve the likelihood that a new device will receive the key fragment transmitted by the transmission logic 206 quickly, and thereby improve the likelihood that the new device will be successfully provisioned by the management device that manages the network-enabled device 200. In embodiments in which provisioning of a new device is not particularly urgent (e.g., when the device is a kitchen or other household appliance, such as a toaster oven), the periodic intervals may be greater than one hour apart (e.g., several hours apart, or days apart).

In some embodiments in which the network-enabled device 200 is a new device, the transmission logic 206 may be configured to, upon completion of the provisioning of a network-enabled device 200 for management by a management device, transmit an indicator to the management device that provisioning of the network-enabled device 200 is complete.

The network-enabled device 200 may include key generation logic 208. The key generation logic 208 may be coupled with the listening logic 204 and the storage device 212, and may be configured to generate a decryption key based on multiple key fragments received via the listening logic 204 and stored in the storage device 212. The decryption key generated by the key generation logic 208 may correspond to a particular management device, and may be used to decrypt an encrypted provisioning message transmitted by that management device. In some embodiments, the key generation logic 208 may be configured to generate a decryption key only if the network-enabled device 200 is a new device; if the network-enabled device 200 has already been provisioned for management by a particular management device, the key generation logic 208 may be configured to ignore key fragments transmitted to the network-enabled device 200.

In some embodiments, the key generation logic 208 must have access to a predetermined number or combination of received key fragments before the decryption key may be generated. This predetermined number may be greater than or equal to two, requiring that the network-enabled device 200 receive a key fragment from at least two peer devices before the key generation logic 208. The decryption key may not be generatable with access to fewer than the predetermined number of key fragments. The key fragments may be generated in any suitable manner that enables a receiving device to generate the decryption key upon access to a predetermined number and/or combination of the key fragments.

In some embodiments, the key fragments may be generated by the management device in accordance with a secret sharing technique. Several secret sharing techniques are known in cryptography for distributing a "secret" among a group of participants, each of which is allocated a "share" of the secret. The secret may be reconstructed with shares contributed from a predetermined number of the participants. In some secret sharing techniques, it is not possible to reconstruct the secret if fewer than the predetermined number of participants participate.

Mathematically, some secret sharing techniques may be characterized such that, given a secret S in a field F, and a natural number k, the secret sharing technique generates n shares, where n is greater than or equal to k. These n shares, $S_1, S_2, \ldots, S_n$, are generated so as to have the following properties:
1. Knowledge of any k or more shares allows S to be readily generated.
2. Knowledge of any k−1 or fewer shares leaves S completely undetermined.

If k=n, then all n of the shares are required to generate the secret S.

In the Shamir secret sharing technique, in order to share a secret encodable into m bits of data, a field F may be selected that has at least $2^m$ elements. For example, the field of real numbers may be used as the field F. Let $a_0$ represent the element of F that is the secret to be shared. In some such techniques, k−1 elements from the field F (labeled $a_1, a_2, \ldots, a_{k-1}$) may be selected by the management device at random (e.g., using any known random or pseudo-random selection technique). Next, a kth degree polynomial f(x) may be constructed by the management device in accordance with:

$$f(x)=a_0+a_1*x+a_2*x^2+ \ldots +a_{k-1}*x^{k-1} \quad (1)$$

Next, the management device may identify n different ordered pairs, (i, f(i)), where i=1, 2, . . . , n. Since a (k−1)th degree polynomial is uniquely determined by knowledge of any k points on the polynomial, the polynomial f(x) may be uniquely identified with access to any k of the n ordered pairs (i, f(i)) (e.g., by interpolation). When the polynomial f(x) has been reconstructed, the value $a_0$ may be readily identified by evaluating the polynomial f(x) at x=0 (the y-intercept), and thus the secret may be generated.

In the embodiments disclosed herein, the management device may encode the decryption key as $a_0$. If the decryption key is not already a number, this encoding may be done in any desired manner (e.g., by encoding each character into a binary number of known length and concatenating all of the binary numbers). The management device may then generate the key fragments in accordance with the technique described above for the generation of shares. The predetermined number of key fragments required to generate the key (referred to as k in the above discussion) may be selected by an administrator of the management device, hard-coded into the management device during manufacture, or may be set in any other desired manner. The total number of key fragments (referred to as n in the above discussion) may be equal to the number of peer devices managed by the management device, or may be smaller or greater than that number.

The above secret sharing technique is simply illustrative and any of a number of secret sharing techniques may be used, having the same or different properties. For example, Blakly secret sharing, Chinese remainder theorem sharing, XOR-based sharing, or any other sharing technique may be used. In some embodiments, generation of the decryption key may rely on the ordered rearrangement of key fragments; in such embodiments, the key fragments may be transmitted along with key fragment data indicating the ordinal position of the key fragment for use in generating the decryption key. For example, in some embodiments, the decryption key may be generated by concatenating a predetermined combination of key fragments in a predetermined order specified by the ordinal position of the key fragments. Such an embodiment may not have the properties discussed above with reference to the Shamir secret sharing technique.

When a message received by the listening logic 204 is an encrypted provisioning message, and the key generation logic 208 has generated a decryption key that can decrypt the encrypted provisioning message, the key generation logic 208 may be configured to decrypt the encrypted provisioning message using the decryption key. The key generation logic 208 may be configured to provide the decrypted provisioning message to the control logic 210 for further processing.

The network-enabled device 200 may include control logic 210. The control logic 210 may be coupled with the listening logic 204 and may be configured to process messages transmitted to the network-enabled device 200 by a management device. In some embodiments, the control logic 210 may be coupled with the key generation logic 208 and may be configured to provision the network-enabled device 200 in accordance with instructions included in a decrypted provisioning message received by the listening logic 204 and decrypted by the key generation logic 208. Instructions included in the decrypted provisioning message may include any suitable provisioning instructions. For example, instructions included in the decrypted provisioning message may include an authentication key that may be stored in the storage device 212 and used by the network-enabled device 200 to authenticate subsequent control messages. If a subsequent control message can't be authenticated with the stored authentication key, the network-enabled device 200 (e.g., the control logic 210) may implement the control instructions included in the control message. If a subsequent control message cannot be authenticated with the stored authentication key, the network-enabled device 200 may ignore that control message. Other instructions that may be included in a provisioning message may include a set credentials instruction, an instructions to update an identifier for the network-enabled device 200, an instruction to configure a connection to a management device, and an instruction to set an operations mode, for example.

As noted above, in some embodiments in which the network-enabled device 200 is a peer device, the control logic 210 may be configured to process a control message from its management device, the control message including a key fragment for the network-enabled device 200 to later transmit to new devices. For example, the control logic 210 may authenticate the control message with an authentication key associated with the management device and, upon authentication, may receive and cause storage of the key fragment from the control message. The transmission logic 206 may later wirelessly transmit this stored key fragment for receipt by a new device.

In some embodiments in which the network-enabled device 200 is a peer device, the network-enabled device 200 may be manually provisioned for management by a particular management device, rather than "automatically" provisioned using the key fragment-based provisioning techniques described herein. For example, when there aren't yet enough peer devices in proximity of a new device to provide the predetermined number of key fragments necessary to generate the decryption key, provisioning must be performed in another way. Thus, in embodiments in which a new device is one of the first devices to be managed by the management device in a given area (e.g., a home or office), the new device may be manually provisioned in accordance with any conventional provisioning technique. In some embodiments, after manual provisioning, a network-enabled device 200 may receive a key fragment for later transmission in a control message from its management device. In some embodiments, a network-enabled device 200 may receive a key fragment for later transmission during the manual provisioning process.

The storage device 212 may include one or more storage devices and may be configured with data structures appropriate to store any data received, used, or generated before or during operation of the network-enabled device 200. For example, the storage device 212 may store the key fragment assigned to the network-enabled device 200 by its management device for provision to new network-enabled devices. The storage device 212 may store key fragments received from peer devices. The storage device 212 may store encrypted and/or decrypted provisioning messages. The storage device 212 may store encrypted and/or decrypted control messages. The storage device 212 may store one or more authentication keys for use during communication with a management device. Examples of storage devices that may be included in the storage device 212 are discussed below with reference to the memory 804 and the mass storage 806 of FIG. 8.

Figure 3:
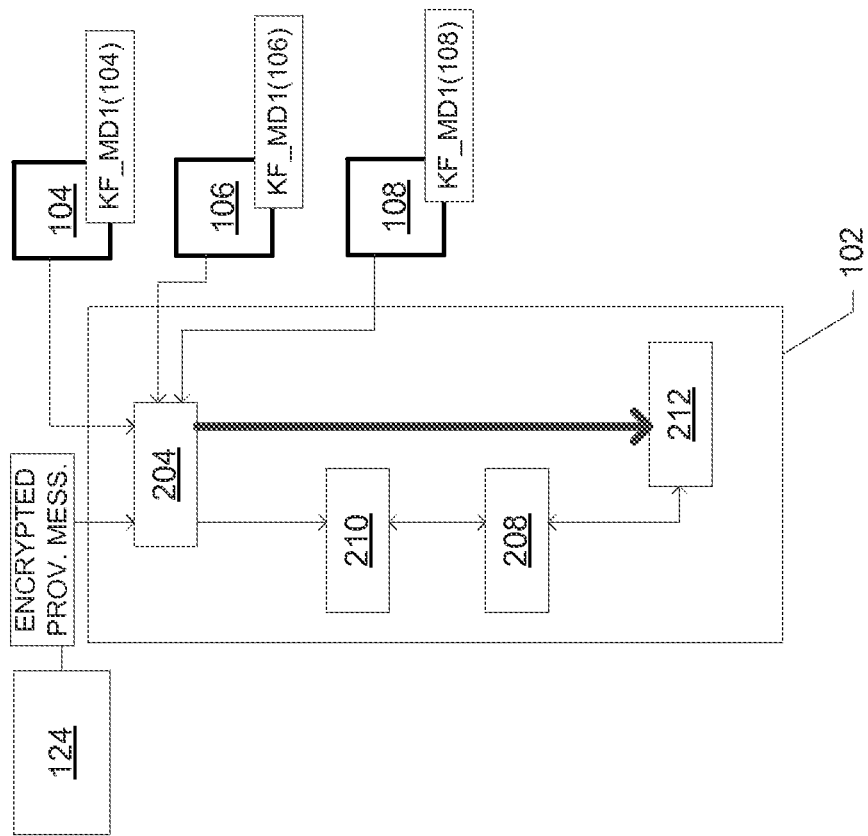
FIG. 3 is a block diagram illustrating signal flows for provisioning a new device, in accordance with various embodiments.

FIG. 3 is a block diagram illustrating signal flows for provisioning the new device 102 in the device environment 100 of FIG. 1, in accordance with various embodiments. The new device 102 may be configured with at least some of the components of the logic discussed above with reference to the network-enabled device 200. Although the block diagram of FIG. 3 focuses on the provisioning of the new device 102 for management by the first management device 124, this is simply for illustrative purposes and the new device 102 may be provisioned for management by any management device using an analogous set of signal flows.

FIG. 3 depicts the transmission of key fragments from the peer devices 104-108 to the listening logic 204 of the new device 102. The peer device 104 may transmit the key fragment KF_MD1(104), the peer device 106 may transmit the key fragment KF_MD1(106), and the peer device 108 may transmit the key fragment KF_MD1(108). In this example, the other peer devices managed by the first management device 124 (namely, the peer devices 110 and 112) are outside the boundary 126, key fragments transmitted by these other peer devices may not be used by the new device 102 in the provisioning process (e.g., because the key fragments are not received or not stored).

FIG. 3 also depicts the transmission of an encrypted provisioning message by the first management device 124 and receipt of the encrypted provisioning message by the listening logic 204 of the new device 102. The listening logic 204 may cause the storage of the encrypted provisioning message and the received key fragments in the storage device 212. In some embodiments, the storage device 212 may include a buffer for storing the received key fragments, as discussed above. The encrypted provisioning message may be passed to the control logic 210.

Upon receipt of the encrypted provisioning message, the control logic 210 may transmit a request to the key generation logic 208 for a decryption key to be used to decrypt the encrypted provisioning message. The key generation logic 208 may retrieve the received key fragments from the storage device 212 and attempt to generate a decryption key using the received key fragments. If a sufficient number of key fragments have been received (e.g., the predetermined number), the key generation logic 208 may generate the decryption key based on the received key fragments, and provide the decryption key to the control logic 210. The control logic 210 may use the decryption key generated by the key generation logic 208 to decrypt the encrypted provisioning message and provision the new device 102 in accordance with instructions included in the decrypted provisioning message. In some embodiments, upon successful provisioning, the transmission logic 206 (not shown in FIG. 3) may transmit an indicator of successful provisioning to the first management device 124. In some embodiments, upon successful provisioning, the new device 102 may be referred to as a "peer device," and may no longer receive and/or store key fragments from peer devices or encrypted provisioning messages from management devices. However, the device 102 may receive its own key fragment from the first management device 124 (via the listening logic 204), and may store that key fragment in the storage device 212 for later transmission to other new devices.

Figure 4:
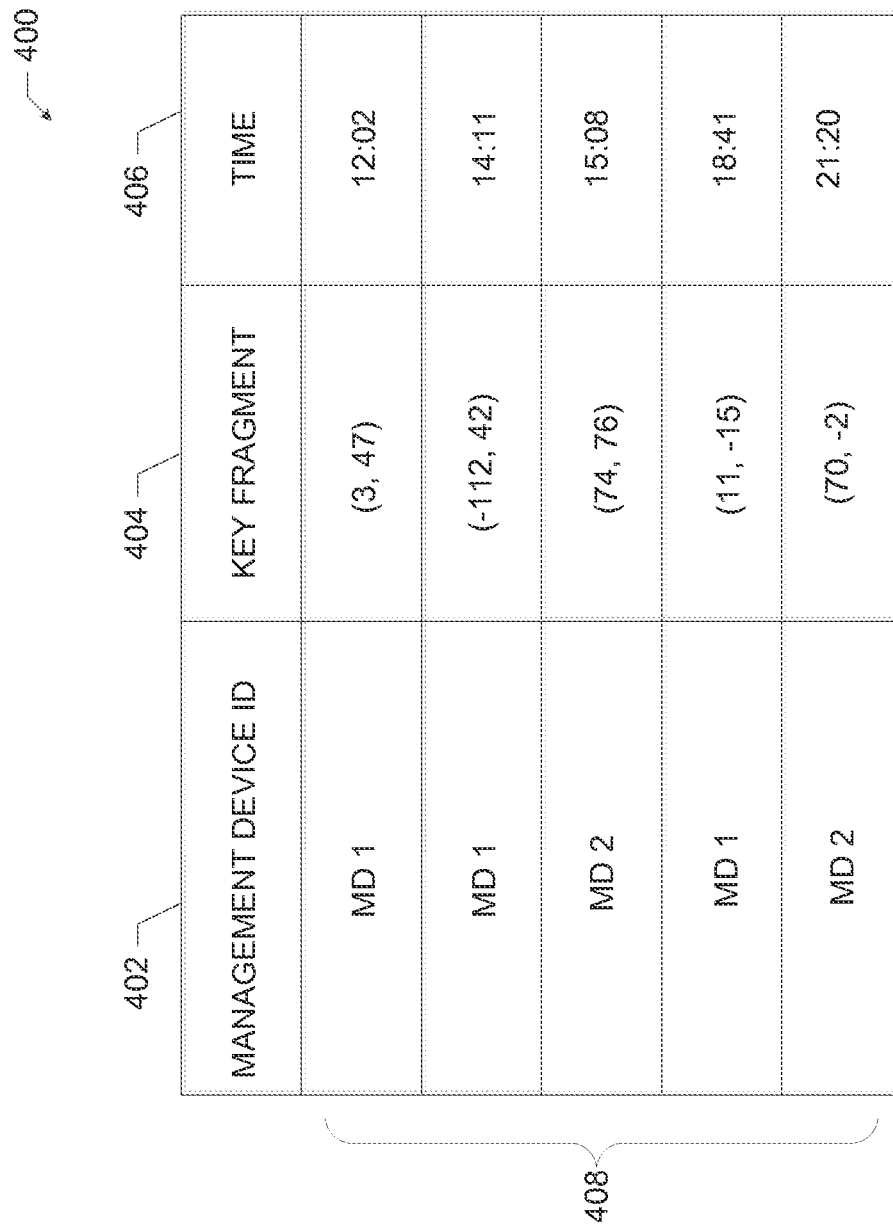
FIG. 4 illustrates a first data structure for storing key fragments in a storage device, in accordance with various embodiments.

As noted above, key fragments received by the listening logic 204 may be stored in the storage device 212 using any appropriate data structure. FIG. 4 illustrates a first data structure 400 for storing key fragments in the storage device 212, in accordance with various embodiments. The data structure 400 may include a management device identifier field 402, a key fragment field 404, and a time field 406. A number of entries 408 are shown in the data structure 400. For a particular entry, the management device identifier field 402 may store an identifier for a particular management device associated with the key fragment stored in the key fragment field 404 for that entry. For example, in the device environment 100 of FIG. 1, key fragments received by the new device 102 may be associated with an identifier representing the first management device 124 or an identifier representing the second management device 122. For a particular entry, the time field 406 may store a time at which the key fragment of that entry was received by the listening logic 204. As noted above, in some embodiments, the key generation logic 208 may only consider key fragments received within a predetermined window when attempting to generate a decryption key; in such embodiments, the key generation logic 208 may use the time information stored in the time field 406 to determine whether or not a particular key fragment should be considered. In some embodiments, no express information about the time of receipt of a key fragment may be stored in the storage device 212, but the listening logic 204 may be configured to remove key fragments from the storage device 212 once the key fragments have been stored in the storage device 212 for longer than a predetermined period of time. In this manner, the storage device 212 may act as a "rolling window" of received key fragments, wherein the duration of the window is equal to the predetermined period of time. The predetermined period of time may be configured in any desired manner. For example, if the network-enabled device 200 has relatively few processing and communication resources, responses to incoming communications may take up to minutes and hours. This may suggest a predetermined period of time measured in hours or days. Such predetermined periods of time may be particularly appropriate when provisioning of the network-enabled device 200 is not subject to a low latency requirement.

As shown, the data structure 400 of FIG. 4 may include key fragments from more than one management device, and may "label" key fragments with identifiers of the management device with which the key fragment is associated. In some embodiments, the storage device 212 may include separate data structures for storing key fragments associated with different management devices. FIG. 5 illustrates a second data structure 500 for storing key fragments in the storage device 212, in accordance with various embodiments. The data structure 500 may include two separate data structures 502 and 504. The first data structure 502 may be associated with the first management device 124, and the second data structure 504 may be associated with the second management device 122.

In some embodiments, upon receipt of a key fragment and an identifier of the management device associated with that key fragment, the listening logic 204 may determine whether a data structure exists for storing key fragments for that particular management device. If yes, the listening logic 204 may direct the newly received key fragment to the appropriate storage device; if not, the listening logic 204 may cause the creation of a new data structure associated with the management device, and may cause the storage of the newly received key fragment in the new data structure. As shown, the first data structure 502 may include a number of entries 506 corresponding to received key fragments associated with the first management device 124, while the second data structure 504 may include a number of entries 508 corresponding to received key fragments associated with the second management device 122.

In some embodiments, the data structure 502 and/or the data structure 504 may be a buffer having a predetermined maximum number of entries corresponding to the predetermined number of key fragments required for the key generation logic 208 to generate a decryption key. Thus, if the data structure 502 (or the data structure 504) is not "full" of key fragments, the key generation logic 208 may readily determine that an insufficient number of key fragments has been received to generate a decryption key for an encrypted provisioning message from the first management device 124 (or from the second management device 122). In some embodiments, the data structure 502 and/or the data structure 504 may act as a "rolling window," as discussed above, and thus may only include key fragments received within the corresponding window.

FIG. 6 is a block diagram of a network-enabled device 600 that may serve as a management device (e.g., the management devices 122 and 124), in accordance with various embodiments. The components illustrated in FIG. 6 are not exhaustive of all of the components that may be included in a management device, but represent components that may be relevant to provisioning of network-enabled devices in accordance with the techniques disclosed herein. Examples of devices that may include the components of the network-enabled device 600 are discussed below with reference to FIG. 8.

The network-enabled device 600 may include key fragment generation logic 604. The key fragment generation logic 604 may be configured to generate multiple key fragments to be distributed among multiple peer devices managed by the network-enabled device 600. The peer devices may then transmit these key fragments for receipt by a new device to enable the new device to generate a decryption key and decrypt an encrypted provisioning message from the network-enabled device 600.

The key fragment generation logic 604 may be configured to generate multiple key fragments based on a decryption key such that access to a predetermined number of the key fragments may enable the generation of the decryption key. The predetermined number may be greater than or equal to two, and the decryption key may not be generatable with access to fewer than the predetermined number. In some embodiments, the key fragment generation logic 604 may be configured to generate the key fragments in accordance with a secret sharing technique, as discussed above. In other embodiments, the key fragment generation logic 604 may generate key fragments in any suitable manner that may enable a receiving device to generate the decryption key upon access to a predetermined number and/or combination of the key fragments. The key fragment generation logic 604 may be coupled with the storage device 610, and may be configured to cause the storage of the generated key fragments in the storage device 610.

In some embodiments, the key fragment generation logic 604 may be configured to generate a new set of multiple key fragments whenever a new device is successfully provisioned for management by the network-enabled device 600. In particular, upon newly managing a total of N devices, the key fragment generation logic 604 may generate a set of N key fragments, of which the predetermined number may be required to generate the decryption key. The network-enabled device 600 may then distribute these new key fragments among its managed devices (e.g., via a control message generated by the control logic 606 and transmitted by the transmission logic 608, discussed below) to cause the managed devices to "update" the key fragment that they transmit to provision new devices. In some embodiments, the network-enabled device 600 may provide a particular key fragment to more than one managed device, rather than providing a different key fragment to each different managed device.

The network-enabled device 600 may include control logic 606. The control logic 606 may be configured to generate messages for transmission to devices already managed by the network-enabled device 600 and new devices. For example, as discussed above, the control logic 606 may be configured to generate an encrypted provisioning message for receipt by a device (e.g., the new device 102). The encrypted provisioning message may be decrypted with the decryption key generated using multiple key fragments, as discussed above, and the provisioning message may include instructions to provision a receiving device for management by the network-enabled device 600. In some embodiments, the instructions included in a provisioning message may include an authentication key to be used by the receiving device to authenticate subsequent control messages. The authentication key may be stored in the storage device 610, and the control logic 606 may be coupled with the storage device 610.

The control logic 606 may be coupled with the key fragment generation logic 604 and/or the storage device 610, and may be configured to generate control messages that include key fragments (generated by the key fragment generation logic 604) for provision to devices managed by the network-enabled device 600. For example, if the first management device 124 is configured with the control logic 606, the first management device 124 may generate control messages that include the key fragments KF_MD1( . . . ) for provision to the peer devices 104-112. The control logic 606 may be configured to cause the storage of generated control messages in the storage device 610 (e.g., prior to transmission of the control messages by the transmission logic 608).

The network-enabled device 600 may include transmission logic 608. The transmission logic 608 may be coupled with the key fragment generation logic 604, the control logic 606, and/or the storage device 610, and may be configured to provide messages for transmission to devices already managed by the network-enabled device 600 and new devices. In some embodiments, the transmission logic 608 may be coupled to an antenna (not shown) and the transmission of messages may be wireless. For example, the transmission logic 608 may be configured to provide the multiple key fragments generated by the key fragment generation logic 604 to multiple devices managed by the network-enabled device 600. In some embodiments, the transmission logic 608 may be configured to broadcast an encrypted provisioning message generated by the control logic 606 (e.g., for receipt by a new device).

The network-enabled device 600 may include other components not illustrated in FIG. 6. For example, the network-enabled device 600 may include listening logic to receive data transmitted to the network-enabled device 600 by other devices. The listening logic may be configured to receive an indicator from a newly provisioned device that provisioning is complete, and may provide that indicator to the control logic 606. In response, the control logic 606 may begin transmitting control messages to the newly provisioned device in accordance with the provisioning instructions (e.g., authenticatable by an authentication key provided to the newly provisioned device).

Figure 7:
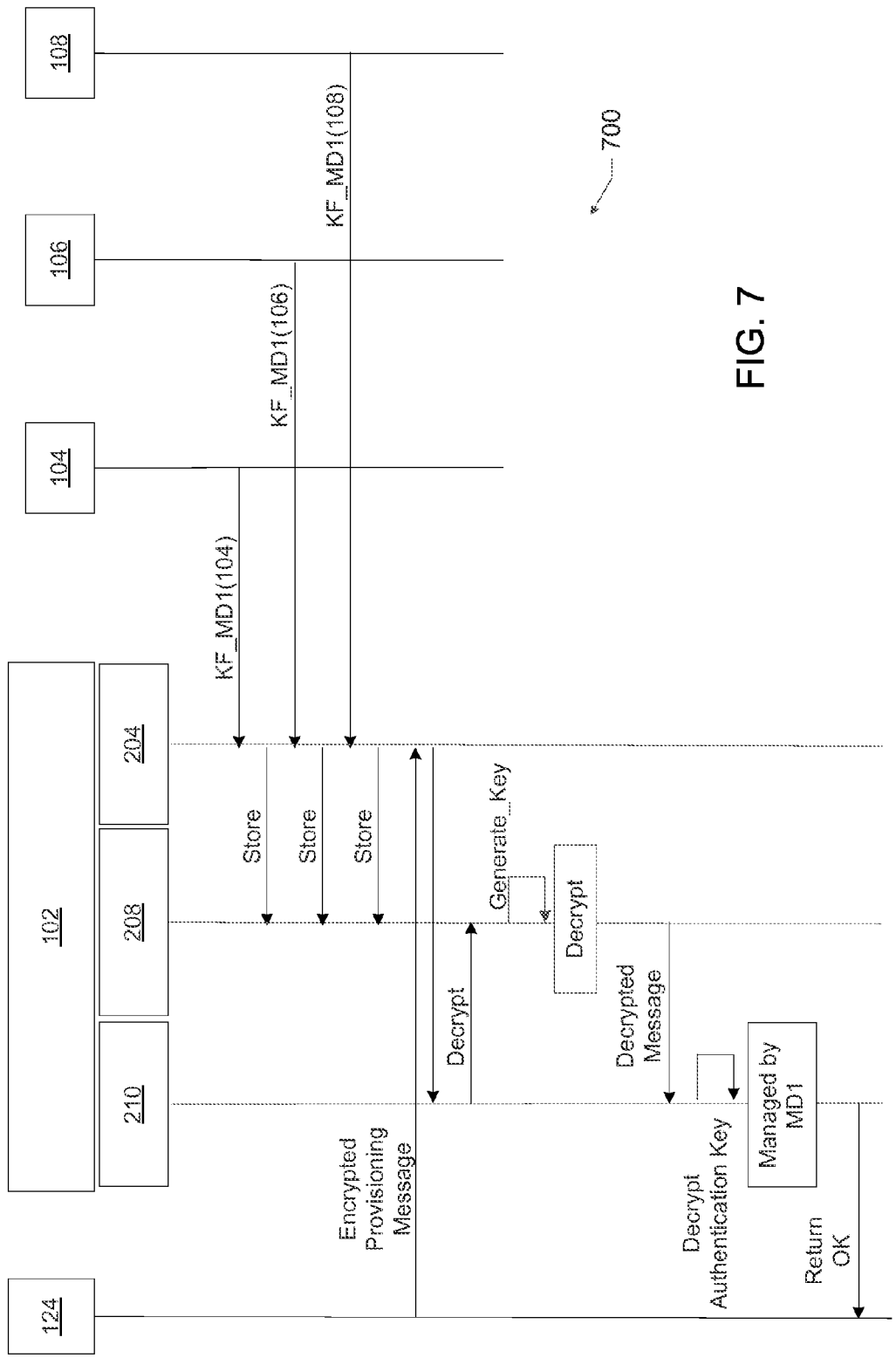
FIG. 7 is a signal diagram illustrating the provisioning of a new device, in accordance with various embodiments.

FIG. 7 is a signal diagram 700 illustrating the provisioning of the new device 102 for management by the first management device 124 in the device environment 100, in accordance with various embodiments. The new device 102 may be configured with at least some of the components of the logic discussed above with reference to the network-enabled device 200. Although the signal diagram of FIG. 7 focuses on the provisioning of the new device 102 for management by the first management device 124, this is simply for illustrative purposes and the new device 102 may be provisioned for management by any management device using an analogous set of signal flows.

In the signal diagram 700, the listening logic 204 of the new device 102 may receive a key fragment from each of the peer devices 104-108 within a predetermined proximity of the new device 102 (e.g., as indicated by the boundary 126 of FIG. 1). The listening logic 204 may cause the storage of these key fragments in the storage device 212 (not shown) so that they may be accessed by the key generation logic 208. The signal diagram 700 also shows an encrypted provisioning message transmitted by the first management device 124 and received by the listening logic 204. Upon receipt of the encrypted provisioning message, the listening logic 204 may notify the control logic 210, which may respond by transmitting a request to the key generation logic 208 to decrypt the encrypted provisioning message.

In response to the request to decrypt the encrypted provisioning message, the key generation logic 208 may attempt to generate a decryption key using the stored key fragments. If the key generation logic 208 does not have access to a sufficient number or combination of key fragments to generate the decryption key, the key generation logic 208 may not be able to service the decryption request and may notify the control logic 210 accordingly (not shown in FIG. 7). If the key generation logic 208 does have access to a sufficient number or combination of key fragments to generate the decryption key, the key generation logic 208 may generate the decryption key, decrypt the encrypted provisioning message, and provide the decrypted provisioning message to the control logic 210. Successful decryption of the encrypted provisioning message from the management device 124 may provide a sign that the management device 124 is the right management device for control of the new device 102. The provisioning message (and later command messages) may include other sensitive information that may be encrypted using one or more additional keys, a second step of command field decryption may be performed. As shown in FIG. 7, this step may use the previously generated decryption key to decrypt an authentication key for further use by the new device 102. Upon provisioning, the control logic 210 may be managed by the first management device 124, and may cause the transmission of an indicator to the first management device 124 that provisioning is complete.

Figure 8:
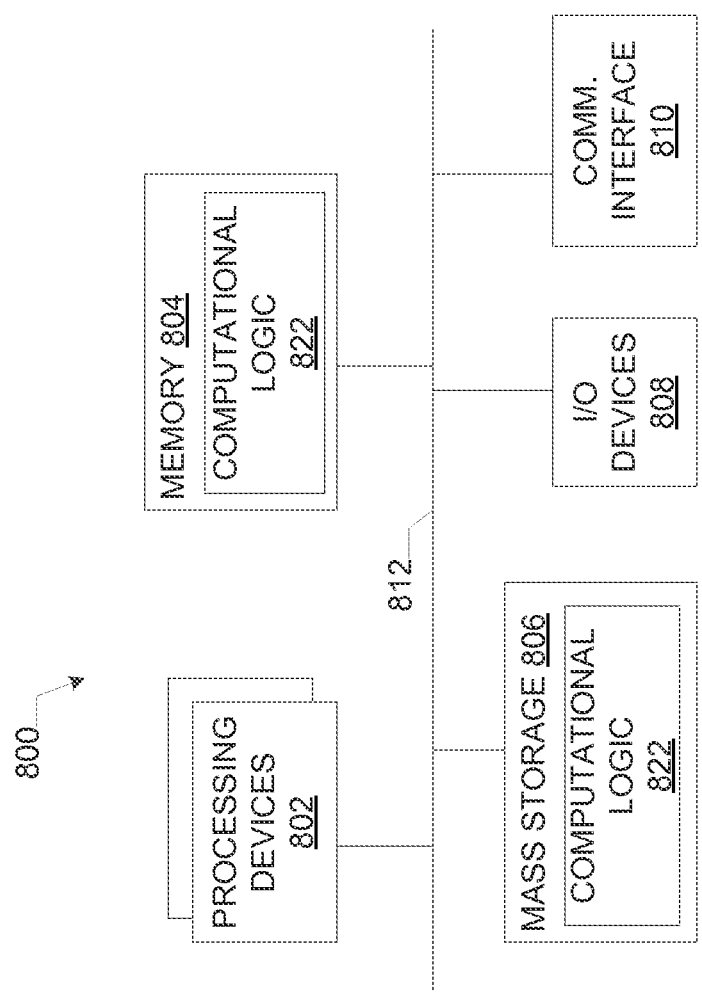
FIG. 8 is a block diagram of an example device suitable for practicing various ones of the disclosed embodiments, in accordance with various embodiments.

Referring now to FIG. 8, a block diagram is provided of an example device suitable for implementing various ones of the embodiments disclosed herein. In various embodiments, the device 800 may be a server, desktop computer, laptop computer, tablet computer, cell phone, smartphone, personal digital assistant, Internet appliance, mobile Internet device, kitchen appliance (e.g., refrigerator, microwave, toaster, blender, vacuum cleaner), home security system, vehicle (e.g., automobile, scooter, or bicycle), entertainment device (e.g., gaming system, television, personal video recorder), or other computing device.

As shown, the device 800 includes a number of processing devices 802 and a system memory 804. Any one or more of the processing devices 802 may be configured to include any of the logic included in the network-enabled device 200 (FIG. 2), the network-enabled device 600 (FIG. 6), or otherwise disclosed herein, as part of a network-enabled device provisioning system. Logic performing the function of any component of the network-enabled devices disclosed herein may be stored at least in part in the system memory 804. Additionally, the apparatus 800 may include mass storage devices 806 (such as diskette, hard drive, compact disc read-only memory (CD-ROM), and so forth), input/output devices 808 (such as display, keyboard, cursor control, and so forth) and communication interfaces 810 (such as network interface cards, modems, antennas, and so forth). The elements may be coupled to each other via system bus 812, which represents one or more buses. In the case of multiple buses, they may be bridged by one or more bus bridges (not shown).

Each of the elements illustrated in FIG. 8 may perform its conventional functions known in the art. In particular, the system memory 804 and the mass storage 806 may be employed to store a working copy and a permanent copy of programming instructions implementing the logic discussed above with reference to the network-enabled devices 200 and 600, or portions thereof, when executed by the respective processing devices 802, herein collectively denoted as computational logic 822. The various components may be implemented by assembler instructions supported by the processing devices 802 or high-level languages, such as, for example, C, that can be compiled into such instructions. The processing devices 802 and the system memory 804 may represent a broad range of processing devices and memory arrangements including arrangements of processing cores of various execution speeds and power consumptions, and memory of various architectures (e.g., with one or more levels of caches) and various types (e.g., dynamic random access, FLASH, etc.).

The permanent copy of the programming instructions may be placed into mass storage 806 in the factory, or in the field, through, for example, a machine-accessible distribution medium (not shown), such as a compact disc (CD), or through communication interface 810 (e.g., from a distribution server (not shown)). That is, one or more distribution media having an implementation of a program may be employed to distribute the program to various devices. The constitution of elements 802-812 is known, and accordingly will not be further described.

Machine-readable media (including non-transitory machine-readable media, such as machine-readable storage media), methods, systems, and devices for performing the above-described network-enabled device provisioning techniques are illustrative examples of embodiments disclosed herein. Additionally, other devices in the above-described interactions may be configured to perform various disclosed techniques.

The following paragraphs describe examples of various embodiments disclosed herein. Example 1 is a network-enabled device, including: a storage device; listening logic, coupled with the storage device, to wirelessly receive a plurality of key fragments from a corresponding plurality of peer devices, to cause storage of the plurality of key fragments in the storage device, and to receive an encrypted provisioning message from a management device; key generation logic, coupled with the storage device, to generate a decryption key based on the plurality of key fragments stored in the storage device and to decrypt the encrypted provisioning message using the decryption key, wherein the decryption key cannot be generated if fewer key fragments than a predetermined number of key fragments are stored in the storage device, and wherein the predetermined number is greater than or equal to two; and control logic, coupled with the key generation logic, to provision the network-enabled device in accordance with instructions included in the decrypted provisioning message.

Example 2 may include the subject matter of Example 1, and may further specify that the plurality of peer devices is managed by the management device.

Example 3 may include the subject matter of any of Examples 1-2, and may further specify that the storage device includes a buffer and the listening logic is to cause storage of the plurality of key fragments in the buffer and to remove key fragments from the buffer that have been in the buffer for longer than a predetermined time period.

Example 4 may include the subject matter of any of Examples 1-3, and may further specify that the instructions included in the decrypted provisioning message include an authentication key and the control logic is to use the authentication key to authenticate subsequent control messages with the authentication key.

Example 5 may include the subject matter of Example 4, and may further specify that the control logic is to ignore control messages that cannot be authenticated with the authentication key.

Example 6 may include the subject matter of any of Examples 1-5, and may further specify that the plurality of peer devices is within a predetermined proximity of the network-enabled device.

Example 7 may include the subject matter of Example 6, and may further specify that a peer device is within the predetermined proximity of the network-enabled device if the received signal strength of a wireless signal transmitting a key fragment from the peer device exceeds a predetermined threshold.

Example 8 may include the subject matter of Example 6, and may further specify that the predetermined proximity is less than approximately 20 meters from the network-enabled device.

Example 9 may include the subject matter of any of Examples 1-8, and may further specify that the listening logic is to wirelessly receive a plurality of key fragment data, wherein individual key fragment data includes a key fragment and a corresponding identifier of the management device.

Example 10 may include the subject matter of any of Examples 1-9, and may further specify that: the management device is a first management device, the plurality of key fragments is a first plurality of key fragments, the plurality of peer devices is a first plurality of peer devices, and the encrypted provisioning message is a first encrypted provisioning message; the storage device includes a first memory region associated with the first management device and a second memory region associated with a second management device different from the first management device; the listening logic is to cause storage of the first plurality of key fragments in the first memory region; the listening logic is to wirelessly receive a second plurality of key fragments from a corresponding second plurality of peer devices and cause storage of the second plurality of key fragments in the second memory region, wherein the second plurality of peer devices is managed by the second management device; the listening logic is to receive a second encrypted provisioning message from the second management device; and the control logic is to, after provisioning of the network-enabled device in accordance with the instructions included in the first decrypted provisioning message, ignore the second encrypted provisioning message.

Example 11 may include the subject matter of any of Examples 1-10, and may further specify that generate the decryption key based on the plurality of key fragments stored in the storage device comprises interpolate the key fragments to identify a polynomial and determine the y-intercept of the polynomial.

Example 12 is a network-enabled device, including: a storage device; control logic, coupled with the storage device, to receive a key fragment in a control message from a management device that manages the network-enabled device and to cause storage of the key fragment in the storage device, wherein: the key fragment is generated in accordance with a secret sharing technique such that a decryption key may be generated by a device having access to a predetermined number of different key fragments, the predetermined number is greater than or equal to two, and the decryption key is complementary to an encryption key used to encrypt a provisioning message broadcast by the management device; and transmission logic, coupled with the control logic, to wirelessly transmit the key fragment for receipt by a device located within a predetermined proximity of the network-enabled device.

Example 13 may include the subject matter of Example 12, and may further specify that the transmission logic is to wirelessly transmit the key fragment at periodic intervals.

Example 14 may include the subject matter of Example 13, and may further specify that the periodic intervals are greater than 1 hour apart.

Example 15 may include the subject matter of any of Examples 12-14, and may further specify that the network-enabled device is a household appliance.

Example 16 may include the subject matter of any of Examples 12-15, and may further specify that the network-enabled device is manually provisioned for management by the management device prior to receiving the key fragment in the control message from the management device.

Example 17 is a network-enabled device, including: key fragment generation logic to generate a plurality of key fragments based on a decryption key, wherein the decryption key is generatable from a predetermined number of key fragments and not generatable from a number of key fragments less than the predetermined number, and wherein the predetermined number is greater than or equal to two; control logic to generate an encrypted provisioning message decryptable with the decryption key, wherein the provisioning message includes instructions to provision a receiving device for management by the network-enabled device; and transmission logic, coupled with the key fragment generation logic and the control logic, to provide the plurality of key fragments to a corresponding plurality of devices managed by the network-enabled device and to broadcast the encrypted provisioning message.

Example 18 may include the subject matter of Example 17, and may further specify that the key fragment generation logic is to generate the plurality of key fragments based on the decryption key using a secret sharing technique.

Example 19 may include the subject matter of Example 18, and may further specify that to generate the plurality of key fragments based on the decryption key using a secret sharing technique comprises to select a plurality of points on a polynomial of a predetermined degree, wherein the predetermined degree is equal to one less than the predetermined number.

Example 20 may include the subject matter of any of Examples 17-19, and may further specify that the instructions included in the provisioning message include an authentication key and the receiving device is to use the authentication key to authenticate subsequent control messages.

Example 21 may include the subject matter of Example 20, and may further specify that the control logic is to, upon receiving an indicator from the receiving device that provisioning is complete, cause the transmission of a control message to the receiving device that is authenticatable by the authentication key.

Example 22 may include the subject matter of any of Examples 17-21, and may further specify that the predetermined number is greater than four.

Example 23 is a method for provisioning a network-enabled device, including: wirelessly receiving, by the network-enabled device, a plurality of key fragments from a corresponding plurality of peer devices; receiving, by the network-enabled device, an encrypted provisioning message from a management device; generating, by the network-enabled device, a decryption key based on the plurality of key fragments stored in the storage device, wherein the decryption key cannot be generated if fewer key fragments than a predetermined number of key fragments are stored in the storage device, and wherein the predetermined number is greater than or equal to two; decrypting, by the network-enabled device, the encrypted provisioning message using the decryption key, and provisioning, by the network-enabled device, the network-enabled device in accordance with instructions included in the decrypted provisioning message.

Example 24 may include the subject matter of Example 23, and may further specify that generating the decryption key based on the plurality of key fragments stored in the storage device comprises interpolating the key fragments to identify a polynomial and determine the y-intercept of the polynomial.

Example 25 may include the subject matter of any of Examples 23-24, and may further include: after provisioning the network-enabled device, receiving, by the network-enabled device, a key fragment in a control message from the management device; causing, by the network-enabled device, storage of the key fragment in the storage device; and wirelessly transmitting, by the network-enabled device, the key fragment for receipt by a device located within a predetermined proximity of the network-enabled device.

Example 26 may include the subject matter of any of Examples 23-25, and may further include: causing, by the network-enabled device, storage of the plurality of key fragments in a buffer; and removing, by the network-enabled device, key fragments from the buffer that have been in the buffer for longer than a predetermined time period.

Example 27 may include the subject matter of any of Examples 23-26, and may further specify that the instructions included in the decrypted provisioning message include an authentication key, and may further include using, by the network-enabled device, the authentication key to authenticate subsequent control messages with the authentication key.

Example 28 may include the subject matter of Example 27, and may further include ignoring, by the network-enabled device, control messages that cannot be authenticated with the authentication key.

Example 29 may include the subject matter of any of Examples 23-28, and may further specify that the plurality of peer devices is within a predetermined proximity of the network-enabled device.

Example 30 may include the subject matter of Example 29, and may further specify that a peer device is within the predetermined proximity of the network-enabled device if the received signal strength of a wireless signal transmitting a key fragment from the peer device exceeds a predetermined threshold.

Example 31 may include the subject matter of Example 29, and may further specify that the predetermined proximity is less than approximately 20 meters from the network-enabled device.

Example 32 may include the subject matter of any of Examples 23-31, and may further include wirelessly receiving, by the network-enabled device, a plurality of key fragment data, wherein individual key fragment data includes a key fragment and a corresponding identifier of the management device.

Example 33 may include the subject matter of any of Examples 23-32, and may further specify that: the management device is a first management device, the plurality of key fragments is a first plurality of key fragments, the plurality of peer devices is a first plurality of peer devices, and the encrypted provisioning message is a first encrypted provisioning message; the storage device includes a first memory region associated with the first management device and a second memory region associated with a second management device different from the first management device; and the method may further include causing, by the network-enabled device, storage of the first plurality of key fragments in the first memory region; wirelessly receiving, by the network-enabled device, a second plurality of key fragments from a corresponding second plurality of peer devices; causing, by the network-enabled device, storage of the second plurality of key fragments in the second memory region, wherein the second plurality of peer devices is managed by the second management device; receiving, by the network-enabled device, a second encrypted provisioning message from the second management device; and after provisioning of the network-enabled device in accordance with the instructions included in the first decrypted provisioning message, ignoring, by the network-enabled device, the second encrypted provisioning message.

Example 34 is a method for provisioning assistance, including: receiving, by a network-enabled device, a key fragment in a control message from a management device that manages the network-enabled device; causing, by the network-enabled device, storage of the key fragment in a storage device, wherein: the key fragment is generated in accordance with a secret sharing technique such that a decryption key may be generated by a device having access to a predetermined number of different key fragments, the predetermined number is greater than or equal to two, and the decryption key is complementary to an encryption key used to encrypt a provisioning message broadcast by the management device; and wirelessly transmitting, by the network-enabled device, the key fragment for receipt by a device located within a predetermined proximity of the network-enabled device.

Example 35 may include the subject matter of Example 34, and may further specify that wireless transmission of the key fragment occurs at periodic intervals.

Example 36 may include the subject matter of Example 35, and may further specify that the periodic intervals are greater than 1 hour apart.

Example 37 may include the subject matter of any of Examples 34-36, and may further specify that the network-enabled device is a household appliance.

Example 38 may include the subject matter of any of Examples 34-37, and may further specify that the network-enabled device is manually provisioned for management by the management device prior to receiving the key fragment in the control message from the management device.

Example 39 is a method for provisioning assistance, including: generating, by a network-enabled device, a plurality of key fragments based on a decryption key, wherein the decryption key is generatable from a predetermined number of key fragments and not generatable from a number of key fragments less than the predetermined number, and wherein the predetermined number is greater than or equal to two; generating, by the network-enabled device, an encrypted provisioning message decryptable with the decryption key, wherein the provisioning message includes instructions to provision a receiving device for management by the network-enabled device; and providing, by the network-enabled device, the plurality of key fragments to a corresponding plurality of devices managed by the network-enabled device; and broadcasting, by the network-enabled device, the encrypted provisioning message.

Example 40 may include the subject matter of Example 39, and may further specify that generation of the plurality of key fragments based on the decryption key uses a secret sharing technique.

Example 41 may include the subject matter of Example 40, and may further specify that generation of the plurality of key fragments based on the decryption key using a secret sharing technique includes selecting a plurality of points on a polynomial of a predetermined degree, wherein the predetermined degree is equal to one less than the predetermined number.

Example 42 may include the subject matter of any of Examples 39-41, and may further specify that the instructions included in the provisioning message include an authentication key and the receiving device is to use the authentication key to authenticate subsequent control messages.

Example 43 may include the subject matter of Example 42, and may further include: upon receiving an indicator from the receiving device that provisioning is complete, causing, by the network-enabled device, the transmission of a control message to the receiving device that is authenticatable by the authentication key.

Example 44 may include the subject matter of any of Examples 39-43, and may further specify that the predetermined number is greater than four.

Example 45 is one or more computer-readable media having instructions thereon that, in response to execution by one or more processing devices of a network-enabled device, cause a network-enabled device to perform the method of any of Examples 23-44.

Example 46 is a network-enabled device, including: means for wirelessly receiving a plurality of key fragments from a corresponding plurality of peer devices; means for receiving an encrypted provisioning message from a management device; generating, by the network-enabled device, a decryption key based on the plurality of key fragments stored in the storage device, wherein the decryption key cannot be generated if fewer key fragments than a predetermined number of key fragments are stored in the storage device, and wherein the predetermined number is greater than or equal to two; means for decrypting the encrypted provisioning message using the decryption key, and means for provisioning the network-enabled device in accordance with instructions included in the decrypted provisioning message.

Example 47 may include the subject matter of Example 46, and may further specify that the means for generating the decryption key based on the plurality of key fragments stored in the storage device comprises means for interpolating the key fragments to identify a polynomial and determine the y-intercept of the polynomial.

Example 48 may include the subject matter of any of Examples 46-47, and may further include: means for, after provisioning of the network-enabled device, receiving a key fragment in a control message from the management device; means for causing storage of the key fragment in the storage device; and means for wirelessly transmitting the key fragment for receipt by a device located within a predetermined proximity of the network-enabled device.

Example 49 may include the subject matter of any of Examples 46-48, and may further include: means for causing storage of the plurality of key fragments in a buffer; and means for removing key fragments from the buffer that have been in the buffer for longer than a predetermined time period.

Example 50 may include the subject matter of any of Examples 46-49, and may further specify that the instructions included in the decrypted provisioning message include an authentication key, and may further include means for using the authentication key to authenticate subsequent control messages with the authentication key.

Example 51 may include the subject matter of Example 50, and may further include means for ignoring control messages that cannot be authenticated with the authentication key.

Example 52 may include the subject matter of any of Examples 46-51, and may further specify that the plurality of peer devices is within a predetermined proximity of the network-enabled device.

Example 53 may include the subject matter of Example 52, and may further specify that a peer device is within the predetermined proximity of the network-enabled device if the received signal strength of a wireless signal transmitting a key fragment from the peer device exceeds a predetermined threshold.

Example 54 may include the subject matter of Example 52, and may further specify that the predetermined proximity is less than approximately 20 meters from the network-enabled device.

Example 55 may include the subject matter of any of Examples 46-54, and may further include means for wirelessly receiving a plurality of key fragment data, wherein individual key fragment data includes a key fragment and a corresponding identifier of the management device.

Example 56 may include the subject matter of any of Examples 46-55, and may further specify that: the management device is a first management device, the plurality of key fragments is a first plurality of key fragments, the plurality of peer devices is a first plurality of peer devices, and the encrypted provisioning message is a first encrypted provisioning message; the storage device includes a first memory region associated with the first management device and a second memory region associated with a second management device different from the first management device; and the network-enabled device may further include means for causing storage of the first plurality of key fragments in the first memory region; means for wirelessly receiving a second plurality of key fragments from a corresponding second plurality of peer devices; means for causing storage of the second plurality of key fragments in the second memory region, wherein the second plurality of peer devices is managed by the second management device; means for receiving a second encrypted provisioning message from the second management device; and means for, after provisioning of the network-enabled device in accordance with the instructions included in the first decrypted provisioning message, ignoring the second encrypted provisioning message.

Example 57 is a network-enabled device, including: means for receiving a key fragment in a control message from a management device that manages the network-enabled device; means for causing storage of the key fragment in a storage device, wherein: the key fragment is generated in accordance with a secret sharing technique such that a decryption key may be generated by a device having access to a predetermined number of different key fragments, the predetermined number is greater than or equal to two, and the decryption key is complementary to an encryption key used to encrypt a provisioning message broadcast by the management device; and means for wirelessly transmitting by the network-enabled device, the key fragment for receipt by a device located within a predetermined proximity of the network-enabled device.

Example 58 may include the subject matter of Example 57, and may further specify that wireless transmission of the key fragment occurs at periodic intervals.

Example 59 may include the subject matter of Example 58, and may further specify that the periodic intervals are greater than 1 hour apart.

Example 60 may include the subject matter of any of Examples 57-59, and may further specify that the network-enabled device is a household appliance.

Example 61 may include the subject matter of any of Examples 57-60, and may further specify that the network-enabled device is manually provisioned for management by the management device prior to receiving the key fragment in the control message from the management device.

Example 62 is a network-enabled device, including: means for generating a plurality of key fragments based on a decryption key, wherein the decryption key is generatable from a predetermined number of key fragments and not generatable from a number of key fragments less than the predetermined number, and wherein the predetermined number is greater than or equal to two; means for generating an encrypted provisioning message decryptable with the decryption key, wherein the provisioning message includes instructions to provision a receiving device for management by the network-enabled device; and means for providing the plurality of key fragments to a corresponding plurality of devices managed by the network-enabled device; and means for broadcasting the encrypted provisioning message.

Example 63 may include the subject matter of Example 62, and may further specify that the means for generating the plurality of key fragments based on the decryption key includes means for generating the plurality of key fragments based on the decryption key using a secret sharing technique.

Example 64 may include the subject matter of Example 63, and may further specify that the means for generating the plurality of key fragments based on the decryption key using a secret sharing technique includes means for selecting a plurality of points on a polynomial of a predetermined degree, wherein the predetermined degree is equal to one less than the predetermined number.

Example 65 may include the subject matter of any of Examples 62-64, and may further specify that the instructions included in the provisioning message include an authentication key and the receiving device is to use the authentication key to authenticate subsequent control messages.

Example 66 may include the subject matter of Example 65, and may further include: means for, upon receiving an indicator from the receiving device that provisioning is complete, causing the transmission of a control message to the receiving device that is authenticatable by the authentication key.

Example 67 may include the subject matter of any of Examples 62-66, and may further specify that the predetermined number is greater than four.

What is claimed is:
1. A network-enabled device, comprising:
one or more processors coupled with a storage device, wherein the one or more processors are to operate listening logic, key generation logic, and control logic, and wherein:
the listening logic is to, for individual device groups of a plurality of device groups:
control wireless receipt of a plurality of key fragments from a plurality of peer devices of a corresponding device group, wherein the network-enabled device is a potential peer device of the device group from which the plurality of key fragments are received,
cause storage of the plurality of key fragments in a corresponding memory region of the storage device, wherein the corresponding memory region is associated with the device group from which the plurality of key fragments are received, and
control receipt of an encrypted provisioning message broadcast by a management device associated with the device group from which the plurality of key fragments are received, and wherein the management device is one of a plurality of management devices;
the key generation logic is to, for individual device groups of the plurality of device groups:
generate a decryption key based on a predetermined number of the plurality of key fragments stored in the corresponding memory region that are received by the listening logic within a predetermined time period, and
decrypt the encrypted provisioning message using the decryption key, wherein the decryption key cannot be generated if fewer key fragments than the predetermined number of key fragments are stored in the corresponding memory region and if fewer key fragments than the predetermined number of key fragments are received by the listening logic within the predetermined time period, and wherein the predetermined number is greater than or equal to two; and
the control logic, coupled with the key generation logic, is to provision the network-enabled device in accor- dance with instructions included in the decrypted provisioning message, and discard any undecrypted provisioning messages.

2. The network-enabled device of claim 1, wherein the plurality of peer devices is managed by the management device.

3. The network-enabled device of claim 1, wherein the storage device includes a buffer associated with the corresponding memory region, and the listening logic is to cause storage of the plurality of key fragments in the buffer and to remove key fragments from the buffer that have been in the buffer for longer than the predetermined time period.

4. The network-enabled device of claim 1, wherein the instructions included in the decrypted provisioning message include an authentication key and the control logic is to use the authentication key to authenticate subsequent control messages with the authentication key.

5. The network-enabled device of claim 4, wherein the control logic is to ignore control messages that cannot be authenticated with the authentication key.

6. The network-enabled device of claim 1, wherein the plurality of peer devices is within a predetermined proximity of the network-enabled device.

7. The network-enabled device of claim 6, wherein a peer device is within the predetermined proximity of the network-enabled device if a received signal strength of a wireless signal transmitting a key fragment from the peer device exceeds a predetermined threshold.

8. The network-enabled device of claim 6, wherein the predetermined proximity is less than a maximum transmission distance defined by a wireless communication protocol used by the network-enabled device to transmit the key fragment.

9. The network-enabled device of claim 1, wherein the listening logic is to wirelessly receive a plurality of key fragment data, wherein individual key fragment data includes a key fragment and a corresponding identifier of the management device.

10. The network-enabled device of claim 1, wherein:
the management device is a first management device, the plurality of key fragments is a first plurality of key fragments, the plurality of peer devices is a first plurality of peer devices, and the encrypted provisioning message is a first encrypted provisioning message;
the storage device includes a first memory region associated with the first management device and a second memory region associated with a second management device of the plurality of management devices that is different from the first management device;
the listening logic is to wirelessly receive a second plurality of key fragments from a corresponding second plurality of peer devices and cause storage of the second plurality of key fragments in the second memory region, wherein the second plurality of peer devices is managed by the second management device;
the listening logic is to receive a second encrypted provisioning message from the second management device; and
the control logic is to, after provisioning of the network-enabled device in accordance with the instructions included in the first decrypted provisioning message, ignore the second encrypted provisioning message.

11. The network-enabled device of claim 1, wherein to generate the decryption key based on the plurality of key fragments stored in the memory region, the key generation logic is to interpolate the key fragments to identify a polynomial and determine a y-intercept of the polynomial.

12. A network-enabled device, comprising:
a storage device;
control logic to be operated by one or more processors coupled with the storage device, to receive a key fragment in a control message from a management device that manages the network-enabled device and to cause storage of the key fragment in the storage device, wherein:
the network-enabled device is a peer device associated with a device group of a plurality of device groups, wherein the device group comprises a plurality of peer devices,
the management device is one of a plurality of management devices, wherein each management device of the plurality of management devices manages a corresponding one of the plurality of device groups,
the control logic is to store the key fragment in a memory region of the storage device associated with the device group, wherein key fragments associated with other device groups are to be stored in other memory regions of the storage device;
the key fragment is generated in accordance with a secret sharing technique such that a decryption key may be generated by a potential peer device having access to a predetermined number of different key fragments from other peer devices in the device group that are received by the potential peer device within a predetermined time period,
the predetermined number is greater than or equal to two,
the decryption key is complementary to an encryption key used to encrypt a provisioning message broadcast by the management device,
the provisioning message is to provision the potential peer device in accordance with instructions included in the decrypted provisioning message, and
undecrypted provisioning messages are ignored; and
transmission logic to be operated by the one or more processors, coupled with the control logic, is to control wireless transmission of the key fragment for receipt by the potential peer device or another potential peer device.

13. The network-enabled device of claim 12, wherein the transmission logic is to wirelessly transmit the key fragment at periodic intervals.

14. The network-enabled device of claim 13, wherein the periodic intervals are greater than 1 hour apart.

15. The network-enabled device of claim 12, wherein the network-enabled device is a computer device implemented in a household appliance.

16. The network-enabled device of claim 12, wherein the network-enabled device is manually provisioned for management by the management device prior to receiving the key fragment in the control message from the management device.

17. A network-enabled device, comprising:
one or more processors coupled with a memory device, the one or more processors to operate key fragment generation logic to generate a plurality of key fragments based on a decryption key, wherein the decryption key is generatable from a predetermined number of key fragments that are received by a potential peer device within a predetermined time period from at least some of a plurality of peer devices of a device group, and not generatable from a number of key fragments less than the predetermined number, and wherein the network-enabled device is a manager of the device group, the device group is one of a plurality of device groups, each device group of the plurality of device groups is managed by a corresponding one of a plurality of management devices, and the predetermined number is greater than or equal to two;

the one or more processors to operate control logic to generate an encrypted provisioning message decryptable with the decryption key, wherein the provisioning message includes instructions to provision a potential peer device for management by the network-enabled device, and wherein the encrypted provisioning messages is to be ignored when the encrypted provisioning messages is not decrypted before another encrypted provisioning message is decrypted; and the one or more processors to operate transmission logic, coupled with the key fragment generation logic and the control logic, to provide the plurality of key fragments to a corresponding one of the plurality of peer devices of the device group managed by the network-enabled device, and broadcast the encrypted provisioning message for receipt by the potential peer device.

18. The network-enabled device of claim 17, wherein the key fragment generation logic is to generate the plurality of key fragments based on the decryption key using a secret sharing technique.

19. The network-enabled device of claim 18, wherein to generate the plurality of key fragments based on the decryption key using a secret sharing technique comprises to select a plurality of points on a polynomial of a predetermined degree, wherein the predetermined degree is equal to one less than the predetermined number.

20. The network-enabled device of claim 17, wherein the instructions included in the provisioning message include an authentication key for authentication of subsequent control messages from the network-enabled device by the potential peer device.

21. The network-enabled device of claim 20, wherein the control logic is to, upon receiving an indicator from the potential peer device that provisioning is complete, cause a transmission of a control message to the potential peer device that is authenticatable by the authentication key.

22. The network-enabled device of claim 17, wherein the predetermined number is greater than four.

23. A method for provisioning a network-enabled device, comprising:

for individual device groups of a plurality of device groups:
wirelessly receiving, by the network-enabled device, a plurality of key fragments from a plurality of peer devices of a corresponding device group associated with a management device, wherein the management device is one of a plurality of management devices, and each management device is associated with a corresponding one of the plurality of device groups;

storing, by the network-enabled device, the plurality of key fragments in a corresponding memory region of a storage device, the corresponding memory region being associated with the device group from which the plurality of key fragments are received;

receiving, by the network-enabled device, an encrypted provisioning message broadcast by the management device associated with the device group from which the plurality of key fragments are received;

generating, by the network-enabled device, a decryption key based on the plurality of key fragments stored in the corresponding memory region that are received within a predetermined time period, wherein the decryption key cannot be generated if fewer key fragments than a predetermined number of key fragments are stored in the storage device and if fewer key fragments than the predetermined number of key fragments are received within the predetermined time period, and wherein the predetermined number is greater than or equal to two;

decrypting, by the network-enabled device, the encrypted provisioning message using the decryption key;

provisioning, by the network-enabled device, the network-enabled device in accordance with instructions included in the decrypted provisioning message; and ignoring, by the network-enabled device, any undecrypted provisioning messages.

24. The method of claim 23, wherein generating the decryption key based on the plurality of key fragments stored in the storage device comprises:

interpolating, by the network-enabled device, the key fragments to identify a polynomial and determine a y-intercept of the polynomial.

25. The method of claim 23, further comprising:

after provisioning the network-enabled device, receiving, by the network-enabled device, another key fragment in a control message from the management device;

causing storage, by the network-enabled device, of the other key fragment in the storage device; and wirelessly transmitting, by the network-enabled device, the other key fragment for receipt by a peer device located within a predetermined proximity of the network-enabled device.

26. The method of claim 23, wherein the management device is a first management device, the plurality of key fragments is a plurality of first key fragments, the plurality of peer devices is a plurality of first peer devices, the predetermined number is a first predetermined number, the encrypted provisioning message is a first encrypted provisioning message, and the method further comprises:

wirelessly receiving, by the network-enabled device, a plurality of second key fragments from a corresponding plurality of second peer devices associated with a second management device;

storing, by the network-enabled device, the plurality of first key fragments in a first memory region of the storage device, wherein the first memory region is associated with the first management device;

storing, by the network-enabled device, the plurality of second key fragments in a second memory region of a storage device, wherein the second memory region is associated with the second management device;

receiving, by the network-enabled device, a second encrypted provisioning message from the second management device;

generating, by the network-enabled device, a second decryption key based on the plurality of second key fragments stored in the second memory region, wherein the second decryption key cannot be generated if fewer second key fragments than a second predetermined number of second key fragments are stored in the second memory region, and wherein the second predetermined number is greater than or equal to two;

decrypting, by the network-enabled device, the first encrypted provisioning message using a first decryption key or the second encrypted provisioning message using the second decryption key;

provisioning, by the network-enabled device, the network-enabled device in accordance with instructions included in the first decrypted provisioning message or the second decrypted provisioning message; and discarding, by the network-enabled device, an undecrypted one of the first encrypted provisioning message or the second encrypted provisioning message after provisioning of the network-enabled device in accordance with instructions included in the first decrypted provisioning message or the second decrypted provisioning message.

27. The method of claim 26, further comprising:

determining, by the network-enabled device, whether the first predetermined number of first key fragments are stored in the first memory region before or after the second predetermined number of second key fragments are stored in the second memory region, and wherein, the generating of the first decryption key occurs when the first predetermined number of first key fragments are stored in the first memory region before the second predetermined number of second key fragments are stored in the second memory region;

or the generating of the second decryption key occurs when the first predetermined number of first key fragments are stored in the first memory region after the second predetermined number of second key fragments are stored in the second memory region.

* * * * *

UNITED STATES PATENT AND TRADEMARK OFFICE
CERTIFICATE OF CORRECTION

PATENT NO. : 9,571,464 B2  
APPLICATION NO. : 14/456509  
DATED : February 14, 2017  
INVENTOR(S) : Oleg Pogorelik et al.

Page 1 of 1

It is certified that error appears in the above-identified patent and that said Letters Patent is hereby corrected as shown below:

In the Claims

Column 29  
Lines 11-12, "...messages is..." should read "...message is..."  
Line 13, "...messages is..." should read "...message is..."

Signed and Sealed this  
Second Day of January, 2018

Joseph Matal  
*Performing the Functions and Duties of the*  
*Under Secretary of Commerce for Intellectual Property and*  
*Director of the United States Patent and Trademark Office*